United States Patent [19]

Kryger

[11] Patent Number: 5,125,614
[45] Date of Patent: Jun. 30, 1992

[54] DEVICE FOR HANGING DISPLAY OF INFORMATION

[76] Inventor: Ko Kryger, 1601 Russet St., Racine, Wis. 53403

[21] Appl. No.: 681,726

[22] Filed: Apr. 8, 1991

[51] Int. Cl.⁵ .............................. G09D 3/00
[52] U.S. Cl. .................... 248/489; 248/682; 40/107; 40/120
[58] Field of Search ........... 248/489, 215, 682, 690, 248/692; 40/617, 107, 120; 211/45

[56] References Cited

U.S. PATENT DOCUMENTS

| | | | |
|---|---|---|---|
| 1,477,463 | 12/1923 | Spragens | 40/107 |
| 1,491,668 | 4/1924 | Brown | 40/107 |
| 1,710,434 | 4/1929 | Shedd | 40/107 |
| 2,213,920 | 9/1940 | Murray | 40/107 X |
| 2,291,703 | 8/1942 | Fifield et al. | 40/107 |
| 2,292,697 | 8/1942 | Juergens | 40/120 X |
| 3,065,946 | 11/1962 | Berkow | 248/215 X |

FOREIGN PATENT DOCUMENTS

| | | | |
|---|---|---|---|
| 484798 | 7/1952 | Canada | 211/94.5 |
| 2297 | of 1869 | United Kingdom | 40/120 |
| 25 | of 1896 | United Kingdom | 40/120 |

*Primary Examiner*—Alvin C. Chin-Shue
*Attorney, Agent, or Firm*—Jansson & Shupe, Ltd.

[57] ABSTRACT

A device for replaceable hanging display of information having a planar hanger member with an elongate slot and at least one permanent display portion adjacent thereto on at least one side thereof, the permanent display portion having an opening spaced from the slot, and at least one substantially planar replaceable display member extending through the slot and divided by a fold into overlying portions, the fold extending along the slot. Different information on different portions of the display member may be selected for display by the manner in which the display member is inserted into the hanger member. Different information on different permanent display portions of the hanger can be displayed by use of different hanging orientations.

13 Claims, 3 Drawing Sheets

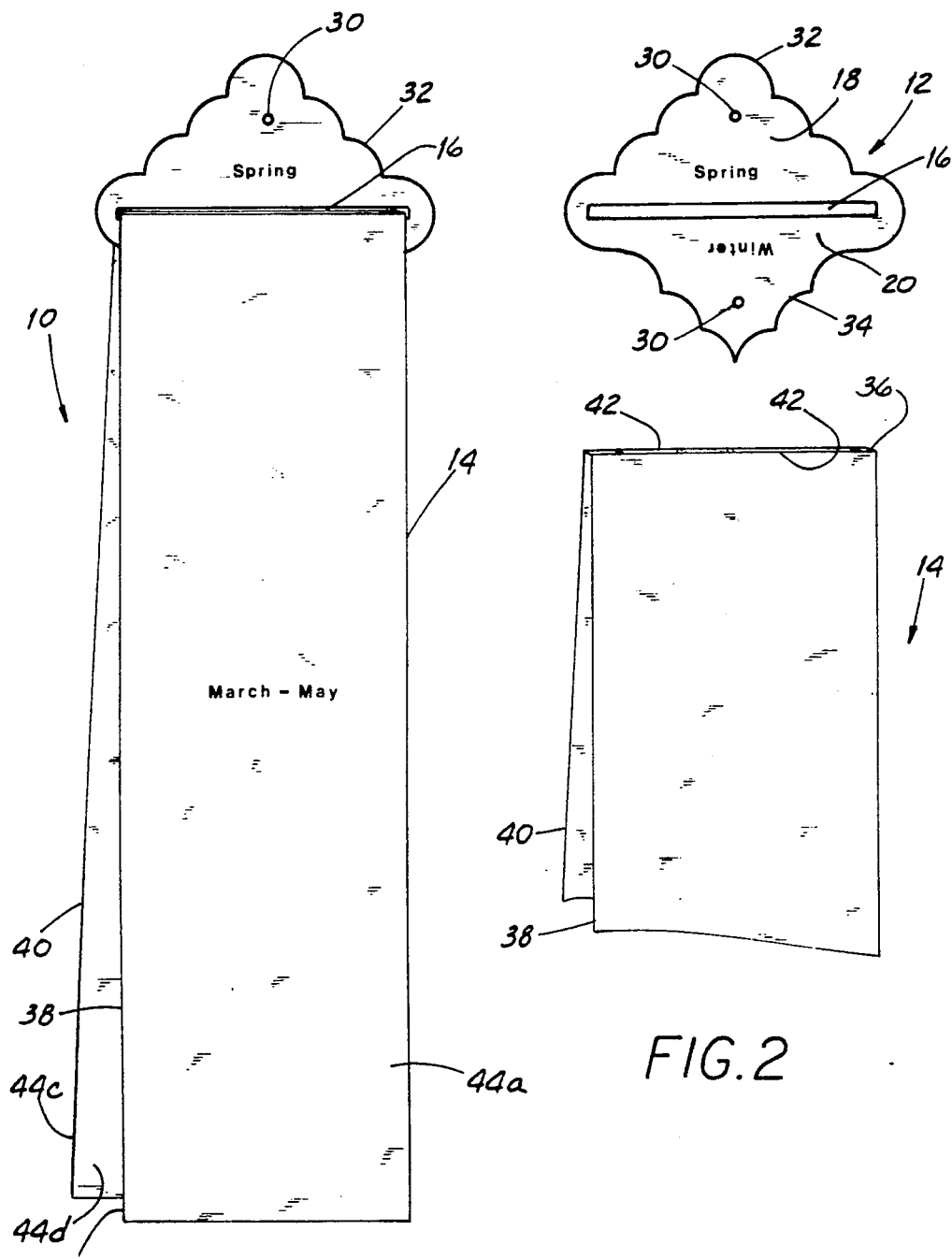

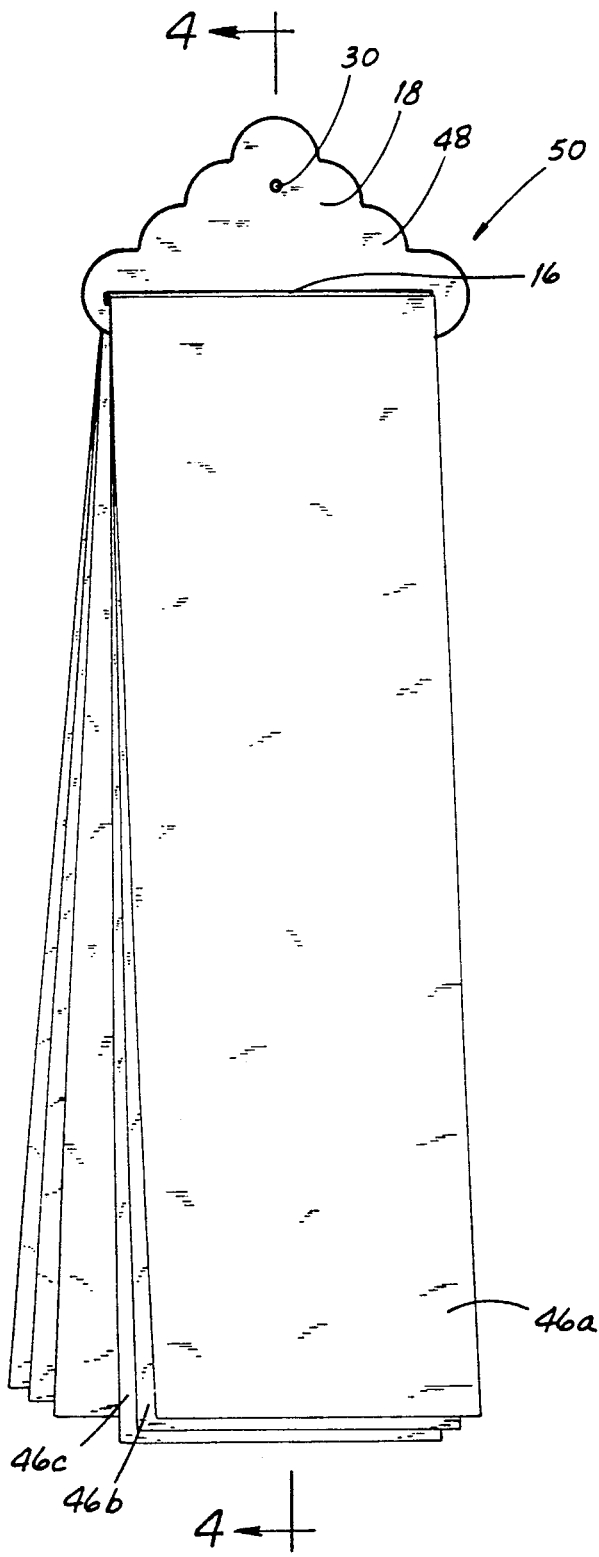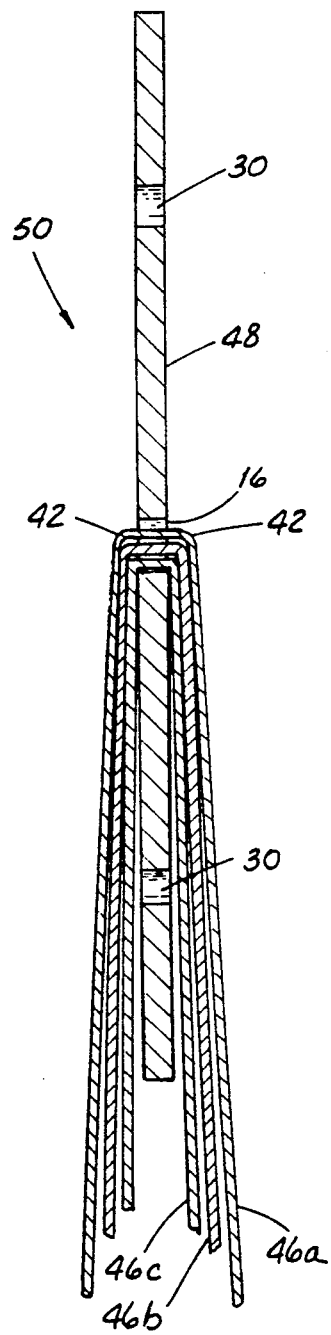
FIG. 3
FIG. 4

DEVICE FOR HANGING DISPLAY OF INFORMATION

FIELD OF THE INVENTION

This invention is related generally to devices for hanging display of information and, more particularly, to wall calendars, schedules, and the like.

BACKGROUND OF THE INVENTION

A vast variety of graphic display devices for hanging on walls and the like have been in use continuously since the creation of flat materials such as paper, paperboard and the like as surfaces for accepting writing or other graphic information. One of the common uses for such devices is calendars. A great variety of configurations are well-known for calendars and similar devices.

Most but not all hanging calendars have tear-off sheets, each representing a month or a series of months. Some calendars are ring-bound such that a display facing can be turned over to the back of the calendar to expose the next display sheet. In neither of such cases are the display sheets replaceably attached to the remainder of the device. Many calendars of the type having removable display sheets have a single permanent display portion which extends above the removable display sheets. Such permanent display portions are typically unchangeable.

A number of advantages and disadvantages may be seen in various configurations of hanging information display devices. While there are a great variety of hanging configurations, new configurations not having certain of the above characteristics or disadvantages are regarded as significant improvements.

OBJECTS OF THE INVENTION

It is an object of this invention to provide a unique and improved device for replaceable hanging display of graphic information.

Another object of this invention is to provide a unique device for replaceable hanging display which does not require removal of display panels after use.

Another object of this invention is to provide a device for replaceable hanging display which uniquely accommodates the storage of the display panels after their use.

Another object of this invention is to provide a unique device for replaceable hanging display which has changeable display portions extending above removable display sheets.

Another object of this invention is to provide a unique device for replaceable hanging display which has great versatility allowing display in a number of different ways.

Another object of this invention is to provide a unique calendar or schedule which allows a variety of combinations of displays.

These and other important objects will be apparent from the descriptions of this invention which follow.

SUMMARY OF THE INVENTION

This invention is a device for replaceable hanging display of information. It forms a unique form for wall calendars, display schedules, and other similar applications.

The invention includes a substantially planar hanger member having an elongate slot and a permanent display portion adjacent to the slot on at least one side of such slot. The permanent display portion has an opening, spaced from the slot, which is used for hanging on a wall tack or the like. At least one substantially planar replaceable display member extends loosely through the slot. Such display member is divided by a fold into overlying front and back portions, with the fold extending along the slot when the display member is hanging in the hanger member. Different information displayed on the front and back portions of the replaceable display member may be selected for display by the manner in which the display member is inserted into the planar hanger member.

Certain preferred forms of this invention include a plurality of such display members extending through the slot of the hanger member in overlying relationship with one another. Their respective folds are substantially aligned with one another.

The fold preferably includes a pair of closely-spaced parallel creases. Such fold tends to facilitate the overlying relationship between the front and back portions of the display member.

In highly preferred forms, the fold, of whatever form, is reversible, and the front and back overlying portions of each display member each have first and second surfaces. Each such surface preferably bears information for display, such as a particular month or month group in the case of a calendar or schedule.

In preferred forms of this invention, one surface of the hanger member has permanent display portions on both sides of the slot, that is, both above and below the slot. In such cases, both permanent display portions have openings for hanging on a wall tack or the like. This allows the hanger member to be hung in either of at least two orientations. Indeed, since the planar display portion has two surfaces, a hanger member may be made to have four permanent display portions so that it may be hung in any of four orientations.

With a single display member having a reversible fold, as mentioned above, and the front and back overlying portions of such display member each having a first surface and a second surface, each surface bearing different information for display, display reversal to show four different surfaces may be accomplished without withdrawal of the display member from the hanger member.

Display of two of such four surfaces would merely require turning the entire device around (that is, rotating it 180 about a vertical axis) and rehanging it on a wall tack or the like using the same tack opening. Display of the other two of such four surfaces would require folding the display member the opposite way, rotating the device 180° about a horizontal axis extending from the wall, and rehanging the device using the other tack opening.

In such an arrangement, each of the four surfaces of a single display member could bear, for example, a three-month display or schedule, a variety of other quarterly information, or, of course, any other information.

Likewise, the four (or two) permanent display portions of a planar hanger member can bear different information. For example, four permanent display portions of a planar hanger member can bear graphics in some way related to the four seasons.

Each of the two permanent display portions of the planar hanger member has an outer edge which forms a profile. In certain preferred embodiments, the two profiles of a planar hanger member are formed to be different from one another. The profiles can be artistic and/or designed to signify something.

The devices of this invention are particularly useful for display of important date information—such as the dates of birthdays, anniversaries and the like. The display members may readily be removed from their hanger member and be stored for record purposes.

BRIEF DESCRIPTION OF THE DRAWINGS

FIG. 1 is a perspective view of a preferred device made in accordance with this invention for replaceable hanging display of information.

FIG. 2 a fragmentary exploded perspective of FIG. 1.

FIG. 3 is a perspective view of an alternative embodiment.

FIG. 4 is an enlarged fragmentary sectional view taken along 4—4 as shown in FIG. 3.

DETAILED DESCRIPTION OF PREFERRED EMBODIMENTS

Figure 5A:
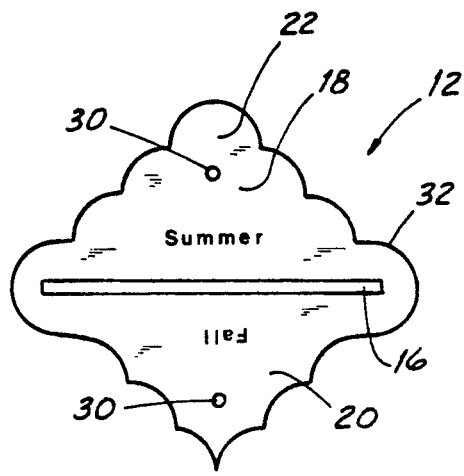
FIGS. 5A-5D are front elevations of the planar hanger member four different orientations.

FIGS. 1, 2, and 5A-5D illustrate a preferred replaceable hanging display device 10 for display of graphic information. Another embodiment of this invention, hanging display device 50, is illustrated in FIGS. 3 and 4.

Display device 10 includes a substantially planar hanger member 12 and a substantially planar replaceable display member 14. Hanger member 12 has a elongate slot 16 therethrough. As shown best in FIGS. 2, 5A and 5C, hanger member 12 has first and second permanent display portions 18 and 20. Permanent display portions 18 and 20 are on a first side 22 of hanger member 12.

Figure 5B:
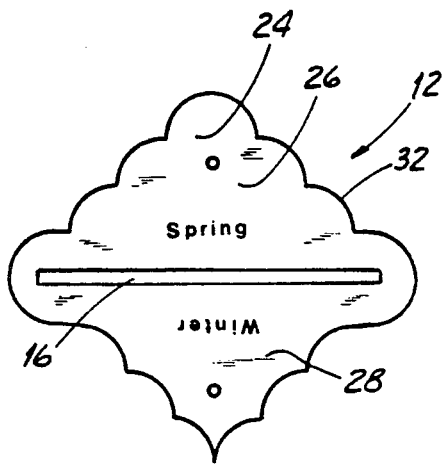
Figure 5C:
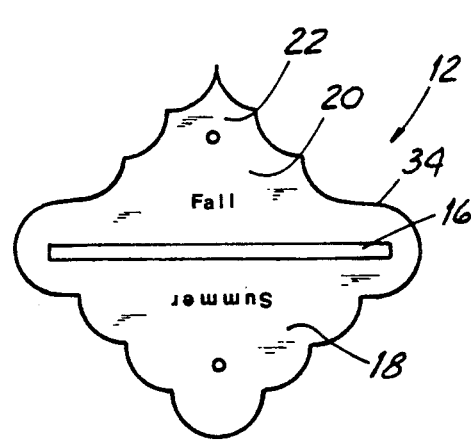
Figure 5D:
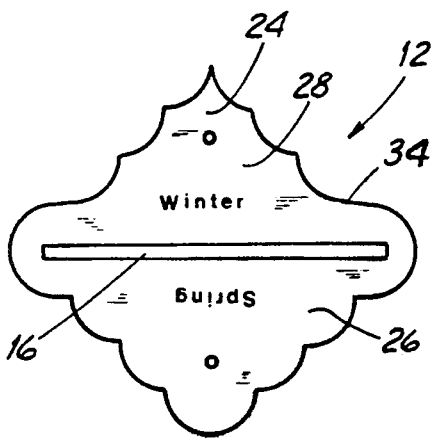

FIGS. 5B and 5D illustrate the opposite or second side 24 of hanger member 12, and show that hanger member 12 has third and four permanent display portions 26 and 28. Permanent display portions 18, 20, 26 and 28 can bear different information, as simply illustrated by the words shown in FIGS. 1, 2 and 5A-5D, in which the different seasons are indicated. (To avoid unnecessary cluttering of the patent drawings, actual calendar graphics and information are not shown.)

Each permanent display portion has an opening 30 which is spaced from slot 16. When display device 10 is hung on a wall tack or the like, such tack or other device is received in opening 30.

The permanent display portions of hanger member 12 have outer edges 32 and 34 which form profiles. In the display device which is illustrated, the profiles of outer edges 32 and 34 differ from one another. Innumerable varieties of profiles may be used and such profiles can be designed to follow the theme of the graphics on the adjacent permanent display portions.

Replaceable display member 14 extends through slot 16 and is divided by a fold 36 into overlying front and back portions 38 and 40. Display member 14 hangs in hanger member 12 with fold 36 along slot 16.

As shown best in FIG. 2, and in FIGS. 3 and 4 which illustrate an alternate embodiment, fold 36 includes a pair of parallel creases 42 which are spaced from one another in a manner facilitating a close overlying relationship between front and back portions 38 and 40 when display member 14 hangs in slot 16. Each overlying portion 38 and 40 has a first surface and a second surface. Altogether, front and back portions 38 and 40 provide display surfaces 44a, 44b, 44c, and 44d. Each of such display surfaces bear different information for display.

Thus, display device 10, as shown in FIG. 1, displays information concerning the spring months of March through May on display surface 44a. Display device 10 can be turned around, without removal of display member 14 from slot 16, and rehung such that it displays information concerning the summer months of June through August on display surface 44c. In such situation, hanger member 12 would be in the orientation shown in FIG. 5A. Further change, without withdrawing display member 14 from slot 16, may be made by reversing fold 36.

Fold 36 is reversible such that display surfaces 44b and 44d replace display surfaces 44a and 44c as the outermost display surfaces. Such reversing of fold 36 exposes a new hanger member profile and opening 30 such that hanger member 12 will be oriented in the orientations of either FIGS. 5C or 5D, depending on which way device 10 is turned. The way that device 10 is turned at that point with determine whether a fall display (with display surface 44d and second permanent display portion 20 exposed) or a winter display (with display surface 44b and fourth permanent display portion 28 exposed) will be seen.

While considerable variation is possible without frequent withdrawal of display member 14 from slot 16 of hanger member 12, a significant advantage of the invention is the ability to insert and withdraw folded display members, or folded display members in various orientations, from hanger member 12. In many cases it is desirable to withdraw display member 14 from slot 16 and replace it with another display member, or reinsert it. With this in mind, it should be pointed out that the display member(s) extending through slot 16 may be in a variety of forms. For example, the overlying front and back portions need not be of the same size; the back portion can be used merely to facilitate hanging of the display member in slot 16.

FIGS. 3 and 4 illustrate an alternate embodiment of the invention which includes a plurality of display members 46a-46c, each like display member 14 of the embodiment of FIGS. 1, 2 and 5A-5D. The number of such display members in use is dependent on the specific intended application. In the arrangement shown, a single month can be illustrated on each of the twelve display surfaces provided by display members 46a-46c, to provide an entire year of displays.

Hanger member 48 of the embodiment of FIGS. 3 and 4 is identical in every respect to hanger member 12 of the embodiment of FIGS. 1, 2 and 5A-5D, although different graphic information or designs may be shown.

Hanger members 12 and 48 are preferably made using fairly stiff paperboard, plastic or the like. The thickness of such hanger members is preferably somewhat greater than the thickness of display members 14 and 46a-46c. Such display members are preferably made of lighter paperboard or even high-quality paper. A wide variety of materials may be used for the elements of this invention.

While the principles of this invention have been described in connection with specific embodiments, it should be understood clearly that these descriptions are made only by way of example and are not intended to limit the scope of the invention.

I claim:

1. A device for replaceable hanging display of printed information comprising:
   a substantially planar hanger member having an elongate slot and a permanent display portion adjacent to the slot on one side thereof, the permanent display portion having an opening therethrough spaced from the slot; and
   at least one substantially planar replaceable display member extending through the slot and divided by a pre-formed fixed-position fold into overlying front and back portions below said slot, the fold extending along the slot, each of the overlying portions terminating in a free distal end spaced from the fold and unconnected from the distal end of the other overlying portion to allow the insertion and removal of said display member with respect to the slot;
whereby different information displayed on the front and back portions of the replaceable display member may be selected for display by the manner in which the display member is inserted into the planar hanger member.

2. The display device of claim 1 wherein a plurality of such display members extend through the slot of the hanger member, such display members in overlying relationship with their respective folds substantially aligned with one another.

3. The display device of claim 1 wherein the fold comprises a pair of parallel creases, thereby facilitating the overlying relationship between the front and back portions of the display member.

4. The display device of claim 1 wherein:
   the fold is reversible; and
   the front and back overlying portions each have a first surface and a second surface, each of such surfaces bearing information for display.

5. The display device of claim 4 wherein the fold comprises a pair of parallel creases, thereby facilitating the overlying relationship between the front and the back portions of the display member.

6. The display device of claim 1 wherein the hanger member has an additional permanent display portion on the other side of the slot, such additional permanent display portion having an opening therethrough spaced from the slot, whereby the hanger member may be hung in either of at least two orientations.

7. The display device of claim 6 wherein:
   the fold is reversible; and
   the front and back overlying portions each have a first surface and a second surface, each of such surfaces bearing information for display,
whereby display reversal may be accomplished without withdrawal of the display member from the hanger member.

8. The display device of claim 7 wherein a plurality of such display members extend through the slot of the hanger member, such display members in overlying relationship with their respective folds substantially aligned with one another.

9. The display device of claim 7 wherein the fold comprises a pair of parallel creases, thereby facilitating the overlying relationship between the front and back portions of the display member.

10. The display device of claim 6 wherein the two permanent display portions bear different information.

11. The display device of claim 10 wherein each of the two permanent display portions has an outer edge forming a profile, the two profiles differing from one another.

12. The display device of claim 10 wherein each of the permanent display portions has opposite sides, such sides bearing different information.

13. The display device of claim 12 wherein each of the two permanent display portions has an outer edge forming a profile, the two profiles differing from one another.

* * * * *